(12) United States Patent  (10) Patent No.: US 12,069,168 B2
Qi et al.  (45) Date of Patent: *Aug. 20, 2024

(54) PASSIVE CONTINUOUS VARIABLE QUANTUM KEY DISTRIBUTION SCHEME USING A THERMAL SOURCE

(71) Applicant: UT-Battelle, LLC, Oak Ridge, TN (US)

(72) Inventors: Bing Qi, Knoxville, TN (US); Philip G. Evans, Knoxville, TN (US); Warren P. Grice, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 349 days.

This patent is subject to a terminal disclaimer.

(21) Appl. No.: 17/676,484

(22) Filed: Feb. 21, 2022

(65) Prior Publication Data

US 2022/0216988 A1  Jul. 7, 2022

Related U.S. Application Data

(63) Continuation of application No. 16/197,457, filed on Nov. 21, 2018, now Pat. No. 11,258,594.

(51) Int. Cl.
  *H04L 9/08* (2006.01)
  *H04B 10/70* (2013.01)
(52) U.S. Cl.
  CPC ........... *H04L 9/0852* (2013.01); *H04B 10/70* (2013.01)
(58) Field of Classification Search
  CPC ........ H04B 10/70; H04L 9/0858; H04L 9/085
  USPC ....................................................... 380/283
  See application file for complete search history.

(56) References Cited

U.S. PATENT DOCUMENTS

| | | |
|---|---|---|
| 5,115,332 A | 5/1992 | Naito et al. |
| 7,403,623 B2 | 7/2008 | Cerf et al. |
| 8,068,741 B2 | 11/2011 | Lutkenhaus |
| 8,244,082 B2 | 8/2012 | Pacher et al. |
| 9,768,885 B2 | 9/2017 | Qi |
| 10,019,235 B2 | 7/2018 | Nordholt et al. |
| 10,171,237 B2 | 1/2019 | Duplinskiy et al. |
| 10,574,448 B2 | 2/2020 | Djordjevic et al. |
| 10,585,645 B2 | 3/2020 | Qi |
| 10,724,922 B1 | 7/2020 | Yao et al. |
| 11,133,928 B2* | 9/2021 | Rhee ...................... H04B 10/90 |
| 11,212,086 B2* | 12/2021 | Rhee ..................... H04L 9/0858 |
| 11,240,017 B2* | 2/2022 | Zbinden ............... H04L 9/0858 |
| 2008/0198437 A1 | 9/2008 | Shapiro et al. |
| 2010/0142971 A1 | 6/2010 | Chang et al. |

(Continued)

OTHER PUBLICATIONS

Qi, B. et al., "Passive state preparation in the Gaussian-modulated coherent states quantum key distribution", Physical Review A 97, 012317, published Jan. 16, 2018.

(Continued)

*Primary Examiner* — Amare F Tabor
(74) *Attorney, Agent, or Firm* — Warner Norcross + Judd LLP (57) ABSTRACT

A passive continuous variable quantum key distribution scheme, where Alice splits the output of a thermal source into two beams, measures one locally and transmits the other mode to Bob after applying attenuation. A secure key can be established based on measurements of the two beams without the use of a random number generator or an optical modulator.

22 Claims, 9 Drawing Sheets

(56) References Cited

U.S. PATENT DOCUMENTS

2018/0316496 A1 11/2018 Qi
2020/0162248 A1 5/2020 Qi et al.

OTHER PUBLICATIONS

Qi, B. et al., "Passive state preparation in continuous-variable quantum key distribution", Conference on Lasers and Electro-Optics, OSA Technical Digest (online) (Optical Society of America, 2018), paper JTh2A.9, downloaded at https://www.osapublishing.org/abstract.cfm?uri=CLEO_SI-2018-JTh2A.9, and available at least as of Sep. 28, 2018.

Jouguet, P. et al., "Experimental demonstration of long-distance continuous-variable quantum key distribution", available at https://arxiv.org/pdf/1210.6216, published Oct. 23, 2012.

Qi, B., "True randomness from an incoherent source", Review of Scientific Instruments 88, 113101, published Nov. 1, 2017.

Website at http://singlequantum.com/ printed Nov. 16, 2018.

U.S. Appl. No. 16/057,345, filed Aug. 7, 2018.

\* cited by examiner

PASSIVE CONTINUOUS VARIABLE QUANTUM KEY DISTRIBUTION SCHEME USING A THERMAL SOURCE

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present disclosure relates to generating shared random information, quantum communication, quantum cryptography, and quantum key distribution. The following publications by the inventors are each hereby incorporated by reference in their entirety: *Passive state preparation in the Gaussian-modulated coherent-states quantum key distribution*, B. Qi, P. Evans and W. Grice, Physical Review A 97, 012317, published Jan. 16, 2018; and *Passive state preparation in continuous-variable quantum key distribution*, B. Qi, P. Evans and W. Grice, in Conference on Lasers and Electro-Optics, OSA Technical Digest [online] (Optical Society of America, 2018), paper JTh2A.9.

BACKGROUND

Quantum key distribution (QKD) has drawn attention for its proven security against adversaries with unlimited computing power. QKD is a secure communication method that implements a cryptographic scheme (sometimes referred to as a protocol) involving quantum mechanics. In QKD, two remote legitimate clients (typically referred to as Alice and Bob or transmitter and receiver) can establish a secure key by transmitting quantum states through an insecure channel controlled by an adversary (typically referred to as Eve or eavesdropper). The security of the key is based on features of quantum physics, rather than assumptions regarding computationally difficult problems. QKD exploits quantum phenomena to enable communications that can only be intercepted by violating known laws of physics. Accordingly, any attacks by Eve will, with a high probability, disturb the transmitted quantum state, and thus can be detected.

Many practical QKD systems are based on a prepare-and-measure scheme, where Alice prepares quantum states and transmits them to Bob, who in turn performs measurements. The measurement results can act as a key or be used as inputs to a key generation algorithm that can enable secure communication between Alice and Bob. The quantum state preparation step is conventionally implemented in an active manner: Alice first generates truly random numbers using a quantum random number generator, which she uses to prepare a corresponding quantum state by performing modulations on the output of a single source, or switching among multiple sources. One well-known example is the decoy state BB84 QKD using phase randomized weak coherent sources, where for each transmission, Alice randomly prepares one of the four BB84 states, randomly changes the average photon number (to generate either the signal state or one of the decoy states), and (in certain implementations) randomizes the global phase of the weak coherent state. As the transmission rate in QKD has been growing dramatically over the years, it is becoming more and more challenging to prepare quantum state precisely at the corresponding speed.

More recently, passive state preparation schemes have been proposed in QKD as an alternative approach. In this scheme, Alice uses intrinsic fluctuations of the source, or intentionally designs the source in a way such that certain parameters (for example, intensity) will present unpredictable fluctuations. Typically, two optical modes with correlated fluctuations are output from the source. By measuring one mode locally, Alice can determine the random noise carried by the other mode, which will be transmitted to Bob. This idea was initially proposed as a simple way to generate random intensity fluctuations in the decoy-state QKD schemes. Later on, it was also applied in preparing the four BB84 states approximately. So far, the passive state preparation scheme has only been developed in a discrete-variable (DV) QKD based on single photon detection.

Figure 1:
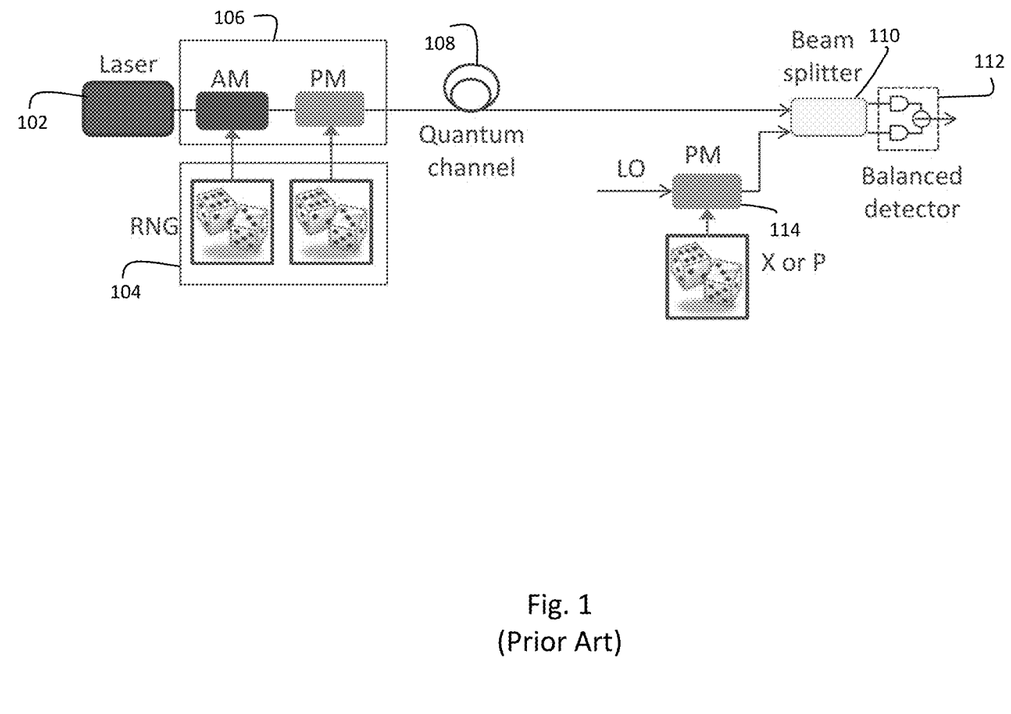
FIG. 1 shows a prior art block diagram of a Gaussian-modulated coherent-states quantum key distribution implementation.

Two families of QKD schemes are discrete-variable (DV) and continuous variable (CV). In essence, CV-QKD is "analog", while discrete-variable (DV) QKD is "digital." One CV-QKD scheme is the Gaussian-modulated coherent-states (GMCS) QKD scheme, which is illustrated in FIG. 1 and has been demonstrated over practical distances. Known implementations of the GMCS QKD are based on an active state preparation scheme: for each transmission, Alice first generates a pair of Gaussian-distributed random numbers 104, encodes them on a weak coherent state 102 using optical amplitude and phase modulators 106, and then transmits the Gaussian-modulated weak coherent pulse to Bob over a quantum channel 108. Since the modulation format is relatively complicated and the tolerable modulation error is small, high extinction ratio modulators with good stability are commonly required in the GMCS QKD scheme.

CV-QKD based on coherent detection is especially appealing for a number of applications because of its compatibility with standard telecom technologies. Nevertheless, high-speed Gaussian random number generators and high performance optical modulators are currently required to implement CV-QKD, impeding its practical application.

SUMMARY

A system and method are provided to yield a passive continuous variable quantum key distribution (CV-QKD) scheme using a thermal source. In one embodiment, a CV-QKD scheme is provided based on coherent detection using a broadband thermal source, such as a continuous wave or pulsed source. The CV-QKD scheme is passive because it operates without a random number generator and without an optical modulator, which simplifies the implementation of CV-QKD and makes it more practical relative to known active CV-QKD schemes and more practical relative to known passive DV-QKD schemes.

In one embodiment of the CV-QKD scheme with a passive state preparation scheme using a thermal source, the transmitter client splits the output of a thermal source into two spatial modes using a beam splitter. The transmitter client measures one mode locally using optical homodyne detectors, and transmits the other mode to the receiver client after applying optical attenuation. A secure key can be established based on the correlation between the transmitter client's measurement results and the receiver client's measurement results. Given the initial thermal state generated by the source being strong enough, this scheme can tolerate high detector noise at the transmitter side. Furthermore, the output of the source does not need to be single mode, since an optical homodyne detector can selectively measure a single mode determined by the local oscillator.

In summary, the present invention provides a simple passive state preparation scheme in CV-QKD, which can be implemented using off-the-shelf amplified spontaneous emission (ASE) sources.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION

The present invention is generally directed to a system and method of a passive state preparation scheme for quantum key distribution using a thermal source. In a Gaussian-modulated coherent-states (GMCS) QKD scheme, such as shown in FIG. 1, from Eve's and Bob's points of view, the quantum states sent by Alice are thermal. In the current embodiments, instead of preparing a thermal state from a coherent state by preforming Gaussian modulations, the transmitter client uses a thermal source.

A thermal source can include essentially any amplified spontaneous emission source, such as a Superluminescent Light Emitting Diode (SLED). The thermal source can be a single mode or multimode source and can be operated in a continuous wave or pulsed mode. One example of a thermal source is a fiber amplifier with a vacuum state input. One such fiber amplifier is the FA-30 fiber optic amplifier available from PRITEL, Inc.

Figure 2:
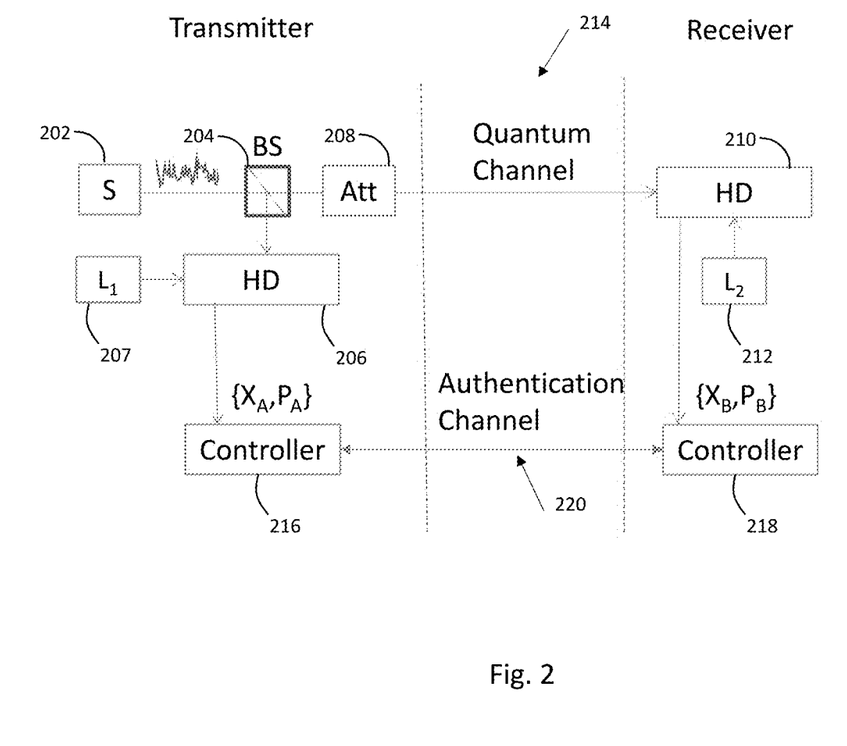
FIG. 2 shows an embodiment of a passive state preparation of continuous variable quantum key distribution (CV-QKD) system using a thermal source.

As shown in FIG. 2, the transmitter client (i.e., Alice) splits the output of the thermal source 202 into two spatial modes using a beam splitter 204. The transmitter side measures the X and/or P quadratures (i.e., quantum states) of one spatial mode using a detector system, such as an optical homodyne detector system 206, in conjunction with a local oscillator 207 (for example a strong light pulse) and transmits the other mode to the transmitter client (i.e., Bob) over a quantum channel 214 after applying optical attenuation, for example with an attenuator 208 or an asymmetric beam splitter. To facilitate correlation with the receiver's quantum state measurements, a transmitter side controller 216 can estimate the quadrature values of the outgoing mode by scaling scale down its measurement results by the attenuation applied on the outgoing beam.

At the receiver client, similar measurements can be performed using a detector system, such as optical homodyne detector system 210, in conjunction with a local oscillator 212 to determine the quadrature values (i.e. quantum states) of the received attenuated spatial mode. Under normal conditions, the transmitter client's measurement results can be correlated to the receiver client's, and a secure key can be established using conventional methods where a transmitter and receiver have shared random information. In this embodiment, the shared randomness originates from the intrinsic quadrature fluctuations of a thermal state. This is in contrast to previous CV-QKD schemes using a noisy coherent state or thermal state, where the super-Poissonian photon statistics of the source is regarded as excess noise in CV-QKD based on active state preparation.

In the current embodiment, the equivalent "preparation" noise in the transmitter can be suppressed by using a bright thermal source and then applying strong and "trusted" attenuation on the outgoing mode. Here, the term "trusted" means the attenuator is well calibrated and cannot be accessed by an eavesdropper. As shown in FIG. 2, noises presented in Alice's detector 206 increases the uncertainty of Alice's estimation on the quantum state of the outgoing mode, and appear as preparation noise. This preparation noise cannot be distinguished from the noises introduced by an eavesdropper and must be suppressed below certain threshold value to make any attack by an eavesdropper on the quantum channel detectable. The "trusted" attenuator 208 reduces the amplitude of the outgoing mode, thus reducing Alice's uncertainty on the mode after the attenuator. This effectively suppresses the equivalent preparation noise due to Alice's detector. In alternative embodiments, instead of a symmetrical beam splitter (50/50 splitting ratio) and a separate attenuator 308, these components can be replaced with an asymmetrical beam splitter. For example, if an asymmetrical beam splitter has a 90/10 splitting ratio, when Alice measures X and P quantum states she can estimate the X and P measured by Bob by accounting for the splitting ratio in her estimate so that the shared key can be established based on the correlation between Alice's estimate and Bob's actual measurements of X and P.

The current embodiments of the CV-QKD scheme involve measuring a quantum state, such as an X and/or P quadrature of a spatial mode. X and P quadratures are a function of the amplitude, E, and phase, Phi, of classical electromagnetic waves. For example, the X and P qudratures can be represented by the following formulas:

$$X = E * \mathrm{Cos}(Phi)$$

$$P = E * \sin(Phi)$$

Figure 3:
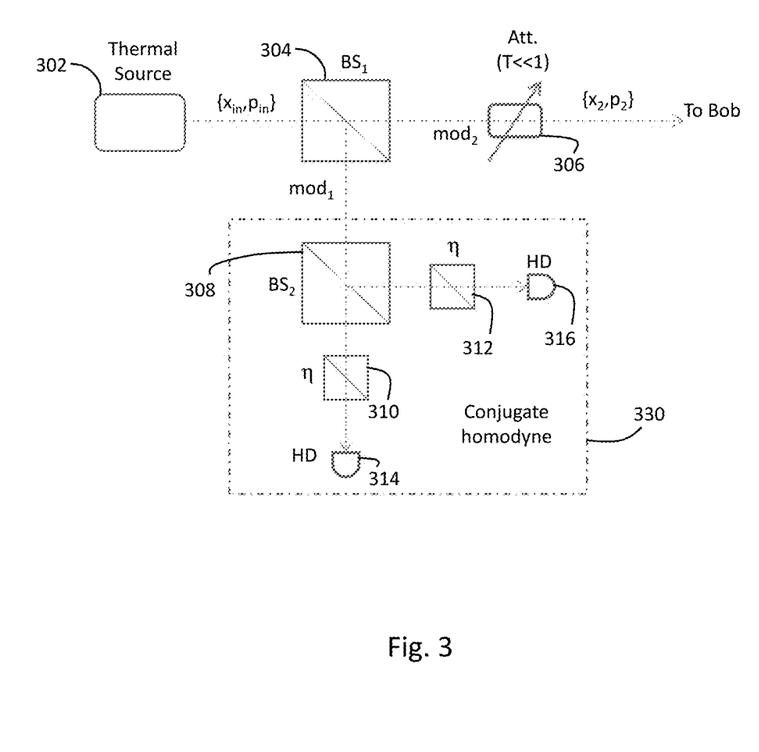
FIG. 3 shows an embodiment of a passive state preparation of continuous variable quantum key distribution (CV-QKD) transmitter using a thermal source.
Figure 4:
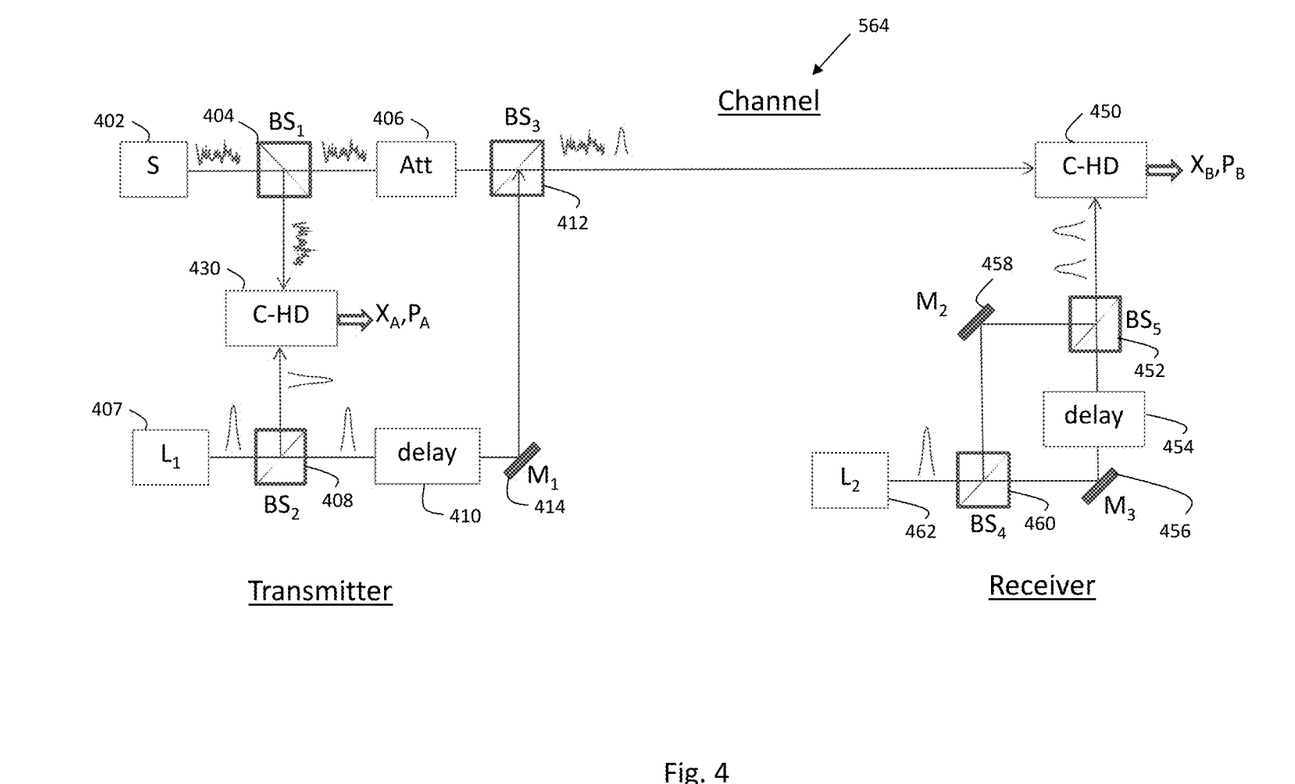
FIG. 4 shows an embodiment of a passive state preparation of continuous variable quantum key distribution (CV-QKD) system using a thermal source.
Figure 5:
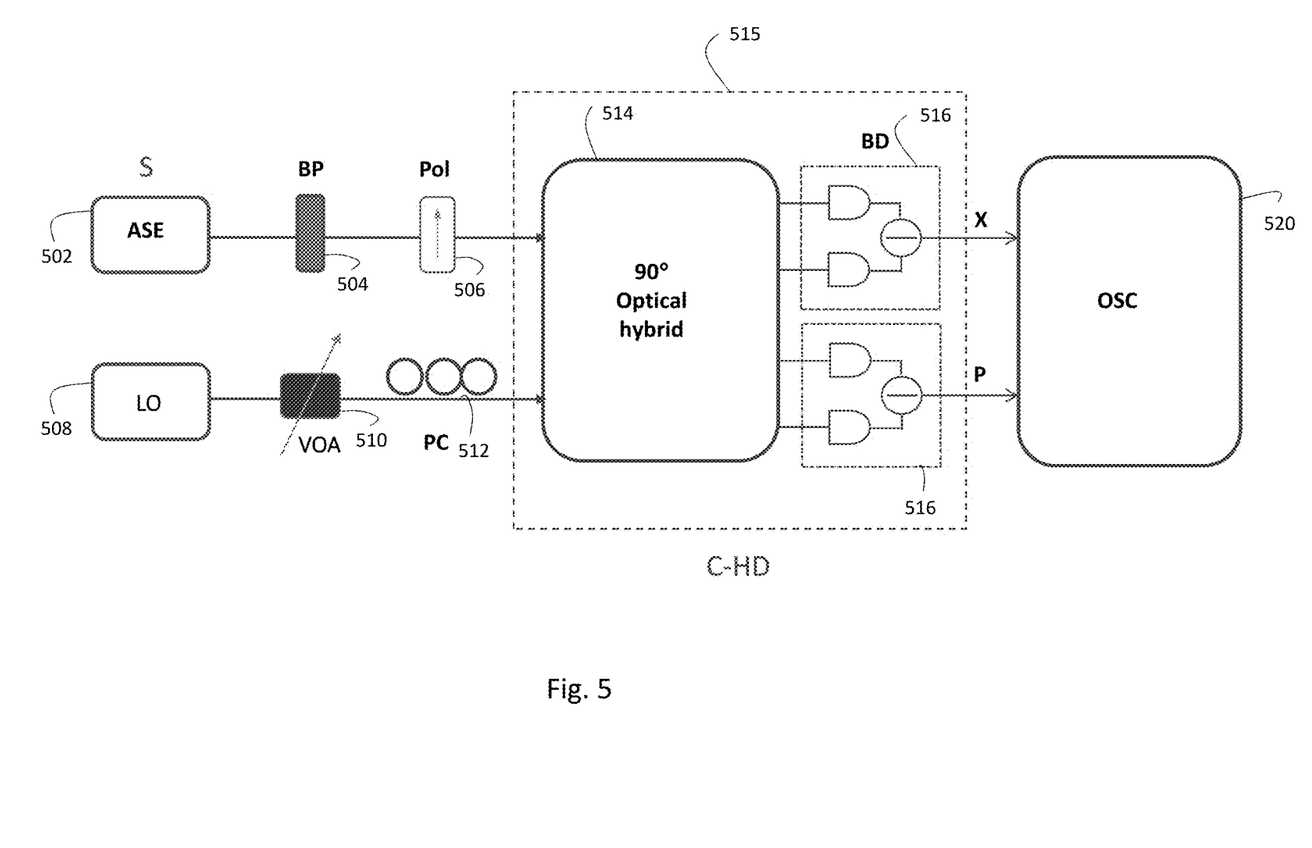
FIG. 5 shows a system for demonstrating the output of a source is a thermal state.

Depending on the application, the system and method can include measuring a single quadrature value by using an optical homodyne detector system. Whether X or P is measured is dictated by the phase of the local oscillator (LO). A conjugate homodyne detector (C-HD), as shown in FIGS. 3, 4, and 5, can be used to measure X and P simultaneously. Inside an exemplary C-HD, there are two sets of optical homodyne detectors with a 90 degree phase shift between them. Perhaps this is best shown with reference to the C-HD 515 of FIG. 5. One of the sets of homodyne detectors measures X, and the other set of homodyne detectors measures P. Accordingly, the transmitter and receiver can be configured to each measure the same quantum state or to each measure multiple of the same quantum states.

Put another way, there are a variety of different possible measurement schemes, for example, a) Alice and Bob can both use C-HD to measure both X and P. In this case, they could generate a secure key from both X and P; b) One of the clients measures both X and P with a C-HD, while the other one uses a single homodyne detector to measure either X or P (that client can randomly choose for each measurement). After the quantum transmission stage, the client with the single homodyne detector unit can inform the other which quadrature has been measured, and they can generate a secure key from that quadrature; c) Both clients use a single homodyne detector unit to measure a randomly chosen quadrature. They can generate a secure key when they happen to measure the same quadrature.

In the protocol, a thermal state is employed as the source of randomness. If its quadrature value is measured with a homodyne detector repeatedly, the outputs are random numbers following Gaussian distribution. In order to generate shared randomness between two parties, a beam splitter is employed to split the thermal state into two output spatial modes. Each output mode is still a thermal state (with half of the power of the input state). The quadrature noises of the two output modes are highly correlated. In the protocol, Alice measures the quadrature values of one mode locally and transmit the other mode to Bob after introducing appropriate attenuation, who in turn measures the quadrature values of the receiving mode. After they have collected a large amount of data, the transmitter and receiver can establish an identical secure key, for example by conducting reconciliation and privacy amplification through a classical authentication channel. For example, as shown in FIG. 2, a transmitter side controller 216 (or other authentication equipment) and receiver side controller 218 (or other authentication equipment) can communicate over a classical authentication channel 220. That is, authentication can be conducted over a standard communication channel between Alice and Bob using conventional techniques. Although FIG. 2 shows a transmitter side controller and a receiver side controller, it should be understood that other devices commonly used in an optical communication system can implement functions such as synchronization, data acquisition, reconciliation, privacy amplification, or other algorithms involved in generating an identical secure key from shared random information between two or more clients. For example, by comparing a subset of data, Alice and Bob can quantify the correlation between their measurement results and estimate the properties of the quantum channel. If the observed correlation is above a certain threshold (or equivalently, the noise introduced by the quantum channel is below a certain threshold), they can further perform reconciliation/privacy amplification algorithm to generate the identical secure key.

One potential issue is that vacuum noise introduced by Alice's conjugate optical homodyne detection could ultimately prevent her from acquiring a precise estimation of the quadrature values of the outgoing mode. However, as discussed in more detail below, if the initial thermal state generated by the source is strong enough, the contribution of Alice's detector noise on the estimation error of the outgoing state can be reduced effectively by introducing high attenuation on the outgoing mode.

In practice, it may be difficult to prepare a single mode thermal state and match its spectral-temporal mode with that of the local oscillator (LO) used in homodyne detection. However, in the protocol of the current embodiment of the present invention, Alice's thermal source does not need to be single mode. The LO in homodyne detection can act as a mode "filter" and can selectively measure only one mode emitted by the source. The only requirement is that the LO at the transmitter's side should be in the same mode as the LO at the receiver's side. By using a multimode (broadband) source, it is also easy to align the central wavelength of the LO within the spectrum of the thermal source.

Figure 9:
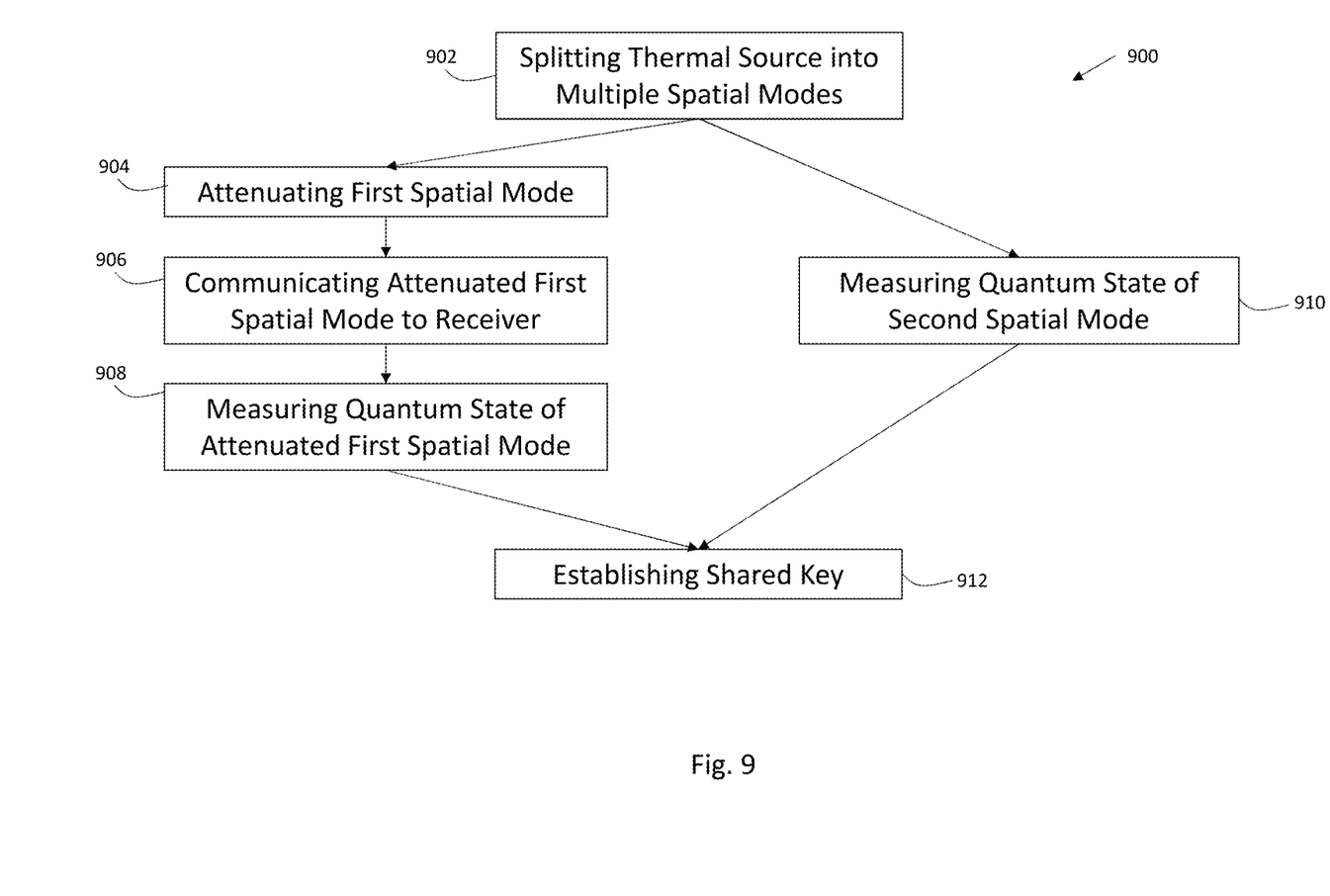
FIG. 9 shows one embodiment of a passive state preparation of continuous variable quantum key distribution (CV-QKD) method using a thermal source.

The passive state preparation using a thermal source of the present invention will now be discussed in more detail mainly with reference to FIG. 3 and FIG. 9. While the protocol can be conveniently implemented with a multimode thermal source, for simplicity, in this section we assume the thermal source is single mode. FIG. 9 illustrates a flowchart of one embodiment of a method of the present invention with the following steps:

(1) Splitting Thermal Source. For example, Alice can split the output of a thermal source 302 into two spatial modes (mod$_1$ and mod$_2$ in FIG. 3) using a 50:50 beam splitter 304. The average output photon number of the source is assumed to be n$_0$. (Step 902).

(2) Attenuating First Spatial Mode. For example, Alice can attenuate the average photon number of mod$_1$ down to V$_A$/2 by using an optical attenuator 306 and transmits it to Bob. Here V$_A$<n$_0$ is the desired modulation variance. (Step 904).

(3) Measuring Quantum State of Second Spatial Mode. For example, Alice can measure both X and P quadratures of mod$_2$ using a conjugate homodyne detection system 330. As shown in FIG. 5, a local oscillator may work in conjunction with the conjugate homodyne detection system 515, 330. The system 330 may include a beam splitter 308 for creating the 90 degree phase shift between the outputs to the two pairs of homodyne detectors 314, 316. From her measurement results of $\{x_2, p_2\}$, Alice can also estimate the quadrature values of the outgoing mode as $$x_A = \sqrt{\frac{2\eta_A}{\eta_D}}\, x_2 \text{ and } p_A = \sqrt{\frac{2\eta_A}{\eta_D}}\, p_2,$$

where $\eta_A$ is the transmittance of the optical attenuator 406 and $\eta_D$ is the efficiency of Alice's detectors 314, 316. The transmittance and efficiency values are represented by $\eta$ 310, 312 in FIG. 3. (Step 910).

(4) Measuring Quantum State of First Spatial Mode. For example, Bob can measure both the X and P quadratures of the received attenuated spatial mode of the thermal source by performing conjugate homodyne detection. The measurement results can be referenced as $\{x_B, p_B\}$. (Step 908).

(5) Repeat 1-4. Alice and Bob can optionally repeat the above process many times.

(6) Establishing Shared Key. Alice and Bob can establish a shared key based on the measured quantum states. For example, they can perform reconciliation and privacy amplification on the raw data $\{x_A, p_A\}$ and $\{x_B, p_B\}$. Given the observed noise is below a certain threshold, they can establish a secure key using conventional methods where a transmitter and receiver have shared random information. For example, devices commonly used in an optical communication system can implement functions such as synchronization and data acquisition and classical authentication schemes can be applied, perhaps as best shown and described in connection with FIG. 2. (Step 912).

From Eve's point of view, the quantum state sent by Alice in this passive state preparation scheme is the same as the one in a conventional active state preparation scheme. So, the well-established security proofs of the GMCS QKD can be applied directly to this scheme. The GMCS QKD is described in more detail in the following publication, which is incorporated by reference in its entirety, JOUGUET, P. et al., "Experimental demonstration of long-distance continuous-variable quantum key distribution", available at https://arxiv.org/pdf/1210.6216, published Oct. 23, 2012.

The secure key rate can be determined accounting for how much additional noise is introduced by the passive state preparation scheme. As discussed below, given the thermal state generated by the source is bright enough, the scheme can tolerate high noise and low efficiency of Alice's detector. In alternative embodiments, the combination of $BS_1$ 304 and Att. 306 in FIG. 3 could be replaced by an asymmetric beam splitter.

An exemplary determination of the X quadrature or X quantum state is provided below. The P quadrature or P quantum state can be determined in a similar way. The X quadrature of the outgoing state to Bob is given by $$x_1 = \sqrt{\frac{\eta_A}{2}} x_{in} + \sqrt{1 - \frac{\eta_A}{2}} x_{v1}, \quad (1)$$

where $x_{in}$ stands for the X quadrature of the output of the source, $\eta_A$ is the transmittance of the optical attenuator, and $x_{v1}$ represents vacuum noise introduced by beam splitter $BS_1$ 304 and the attenuator 306. Similarly, Alice's measurement result of the X quadrature is given by $$x_2 = \sqrt{\frac{\eta_D}{4}} x_{in} + \sqrt{1 - \frac{\eta_D}{4}} x_{v2} + N_{el}, \quad (2)$$

where $\eta_D$ and $N_{el}$ are the efficiency and noise of Alice's detector; $x_{v2}$ represents vacuum noise due to the two 50:50 beam splitters $BS_1$ 304 and $BS_2$ 308 and the loss of the x detector 310. $N_{el}$ is assumed to be Gaussian noise with zero mean and a variance of $v_{el}$. All of the noise variances are defined in the shot-noise unit. Alice can estimate $x_1$ from her measurement result $x_2$ using $$x_A = \sqrt{\frac{2\eta_A}{\eta_D}} x_2. \quad (3)$$

Using (1)-(3), Alice's uncertainty on $x_1$ is given by $$\Delta = \langle (x_A - x_1)^2 \rangle = \frac{2\eta_A}{\eta_D}\left(1 + v_{el} - \frac{\eta_D}{2}\right) + 1. \quad (4)$$

From (4), the excess noise (the noise above vacuum noise) due to the passive state preparation scheme is given by $$\varepsilon_A = \Delta - 1 = \frac{2\eta}{\eta_D}\left(1 + v_{el} - \frac{\eta_D}{2}\right). \quad (5)$$

From (5), by increasing the attenuation on the outgoing mode (decreasing $\eta_A$), the excess noise $\varepsilon_A$ can be effectively reduced. The maximum attenuation Alice can apply is constrained by the average photon number $n_0$ of the thermal state produced by the source and the desired modulation variance $V_A$. Using the relation $V_A = \eta_A n_0$, (5) can be revised as $$\varepsilon_A = \frac{2V_A}{n_0 \eta_D}\left(1 + v_{el} - \frac{\eta_D}{2}\right). \quad (6)$$

From (6), given a desired modulation variance $V_A$, the brighter the source, the smaller the excess noise introduced by Alice. A typical homodyne detector in the GMCS QKD can achieve $\eta_D = 0.5$ and $v_{el} = 0.1$. For a typical value of $V_A = 1$, to reduce the excess noise $E_A$ below 0.01, the required average photon number of the source is about 340 (per spatial-temporal mode), which can be satisfied by a practical ASE source.

FIG. 4 illustrates an embodiment of the passive CV-QKD scheme of the present invention. The transmitter includes a thermal source 402, a beam splitter 404, an attenuator 406, a beam combiner 412, a conjugate homodyne detector 430, a local oscillator 407, a beam splitter 408, a delay unit 410, and a mirror 414. The receiver includes a conjugate homodyne detector 450, a local oscillator 462, a beam splitter 460, mirrors 456, 458, a delay unit 454, and a beam splitter 452. Essentially any phase recovery scheme can be utilized to establish a phase relation between the two local oscillators 407, 462. One possible phase recovery scheme, which is illustrated in FIG. 4, that can be utilized to establish a phase relation between the two local oscillators is discussed in U.S. Pat. No. 9,768,885 to Qi, entitled Pilot-aided feedforward data recovery in optical coherent communications, filed on Sep. 10, 2015, which is hereby incorporated by reference in its entirety. Another scheme to establish a phase reference between transmitter and receiver homodyne detection systems is where Alice generates two strong LOs from the same laser, uses one of them in her local measurement, and sends the second one to Bob to be used as a LO in his measurement.

A simulation of t secure key rates of the passive state preparation scheme can be conducted. The asymptotic secure key rate of the GMCS QKD, in the case of reverse reconciliation, is given by:

$$R = fI_{AB} - \chi_{BE}, \quad (7)$$

where $I_{AB}$ is the Shannon mutual information between Alice and Bob; f is the efficiency of the reconciliation algorithm; $\chi_{BE}$ is the Holevo bound between Eve and Bob. $I_{AB}$ and $\chi_{BE}$ can be determined from the channel loss, observed noises, and other QKD system parameters.

In an exemplary embodiment where the quantum channel between Alice and Bob is telecom fiber with an attenuation coefficient of γ, the channel transmittance is given by $$T = 10^{\frac{-\gamma L}{10}}, \quad (8)$$

where L is the fiber length in kilometers. In the case of conjugate homodyne detection, the noise added by Bob's detector (referred to Bob's input) is given by $$\chi_{het} = [1 + (1 - \eta_D) + 2\upsilon_{el}]/\eta_D, \quad (9)$$

where we have assumed that Bob's detector has the same performance as Alice's. The channel-added noise referred to the channel input is given by $$\chi_{line} = \frac{1}{T} - 1 + \varepsilon_E, \quad (10)$$

where $\varepsilon_E$ is the excess noise due to Eve's attack. In practice any untrusted noise from the QKD system can be included into $\varepsilon_E$. $\varepsilon_E$ can be separated into two terms, $$\varepsilon_E = \varepsilon_A + \varepsilon_0, \quad (11)$$

where $\varepsilon_A$ is the excess noise due to the passive state preparation scheme as given in (6). $\varepsilon_0$ represents other sources of untrusted noise. The overall noise referred to the channel input is given by $$\chi_{tot} = \chi_{line} + \frac{\chi_{het}}{T}. \quad (12)$$

Since both quadratures can be used to generate the secure key, the mutual information between Alice and Bob can be determined by $$I_{AB} = \log_2 \frac{V + \chi_{tot}}{1 + \chi_{tot}}, \quad (13)$$

where $V = V_A + 1$.

To estimate $\chi_{BE}$, a realistic noise model where Eve cannot control the loss inside Bob's system can be adopted, and the detector noise from Bob can be assumed to be trusted. Under this model, the Holevo bound of the information between Eve and Bob is given by:

$$\chi_{BE} = \sum_{i=1}^{2} G\left(\frac{\lambda_i - 1}{2}\right) - \sum_{i=3}^{5} G\left(\frac{\lambda_i - 1}{2}\right), \quad (14)$$

where $$G(x) = (x+1)\log_2(x+1) - x\log_2 x,$$

$$\lambda_{1,2}^2 = \frac{1}{2}\left[A \pm \sqrt{A^2 - 4B}\right], \quad (15)$$

where $$A = V^2(1 - 2T) + 2T + T^2(V + \chi_{line})^2, \quad (16)$$

$$B = T^2(V\chi_{line} + 1)^2, \quad (17)$$

$$\lambda_{3,4}^2 = \frac{1}{2}\left[C \pm \sqrt{C^2 - 4D}\right], \quad (18)$$

where $$C = \frac{1}{(T(V + \chi_{tot}))^2}[A\chi_{het}^2 + B + 1 + 2\chi_{het}, \quad (19)$$

$$\times (V\sqrt{B} + T(V + \chi_{line})) + 2T(V^2 - 1)],$$

$$D = \left(\frac{V + \sqrt{B}\chi_{het}}{T(V + \chi_{tot})}\right)^2, \quad (20)$$

$$\lambda_5 = 1. \quad (21)$$

Simulation parameters can be summarized as follows: γ=0.2 dB/km, $\varepsilon_0$=0.01, $\upsilon_{el}$=0.1, $\eta_D$=0.5, and f=0.95. The modulation variance $V_A$ can be numerically optimized at different fiber lengths.

Figure 6:
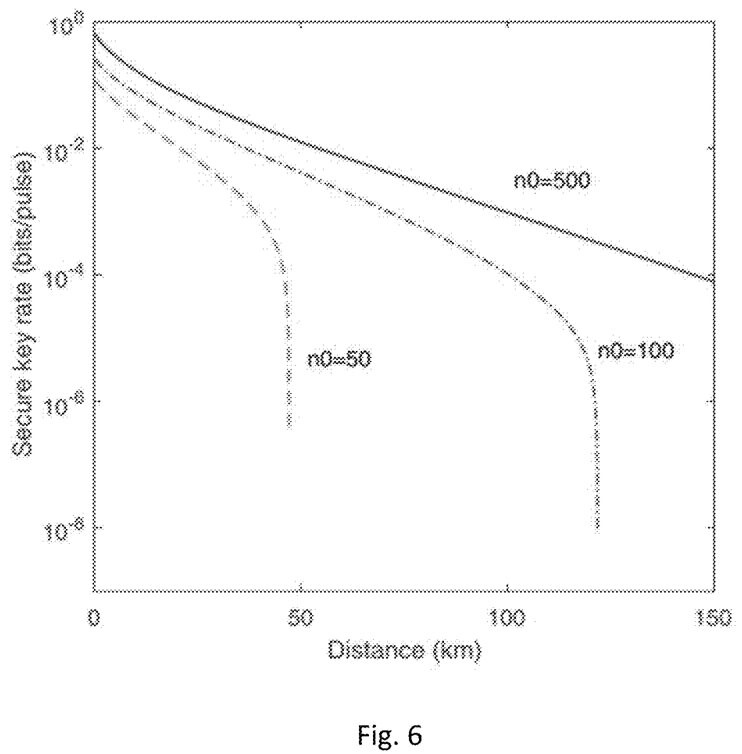
FIG. 6 shows a graph of simulation results of the secure key rate for three different average photon numbers of the thermal state.

FIG. 6 shows exemplary relations of the secure key rate and the fiber length for three different average photon numbers $\eta_0$. As shown in FIG. 6, a thermal source with an average output photon number above 100 can be employed to implement the passive CV QKD scheme efficiently.

Previous studies have shown that the ASE noise generated by a fiber amplifier is thermal. Conjugate homodyne detection can be conducted to verify the photon statistics of a single-mode component (selected by the LO) of an ASE source follows a Bose-Einstein distribution, as expected from a single-mode thermal state. Nevertheless, the average photon number of the thermal state is relatively low (about 15). The output of a commercial ASE source operated at higher output power can also be characterized in this way.

FIG. 5 shows an exemplary setup that demonstrates that the output of a practical source is a thermal state. Accordingly, this demonstration setup does not illustrate a complete quantum key distribution system, but rather a portion of one sufficient to demonstrate the thermal state. The system includes a fiber amplifier (PriTel) with vacuum state input as a broadband thermal source 502. A 0.8-nm optical bandpass filter 504 centered at 1542 nm placed after the amplified spontaneous emission source to reduce the power of unused light. To select out a single polarization mode, a fiber pigtailed polarizer 506 can be employed. A continuous-wave (CW) laser source with a central wavelength of 1542 nm, such as the Clarity-NLL-1542-HP from Wavelength Reference, can be employed as the local oscillator (LO) 508 in coherent detection. It is not necessary to stabilize the laser wavelength, which can never drift out the above 0.8-nm range under normal operation. A variable optical attenuator 510 can be used to adjust the LO power, and a fiber polarization controller 512 can be used to match the polarization of the LO with that of the thermal source 502. Conjugate optical homodyne detection can be performed with a commercial 90° optical hybrid 514, available from Optoplex, and two balanced amplified photodetectors 516, available from Thorlabs. The outputs of the two balanced photodetectors can be sampled by a real time oscilloscope 520, or other measurement device.

Figure 7:
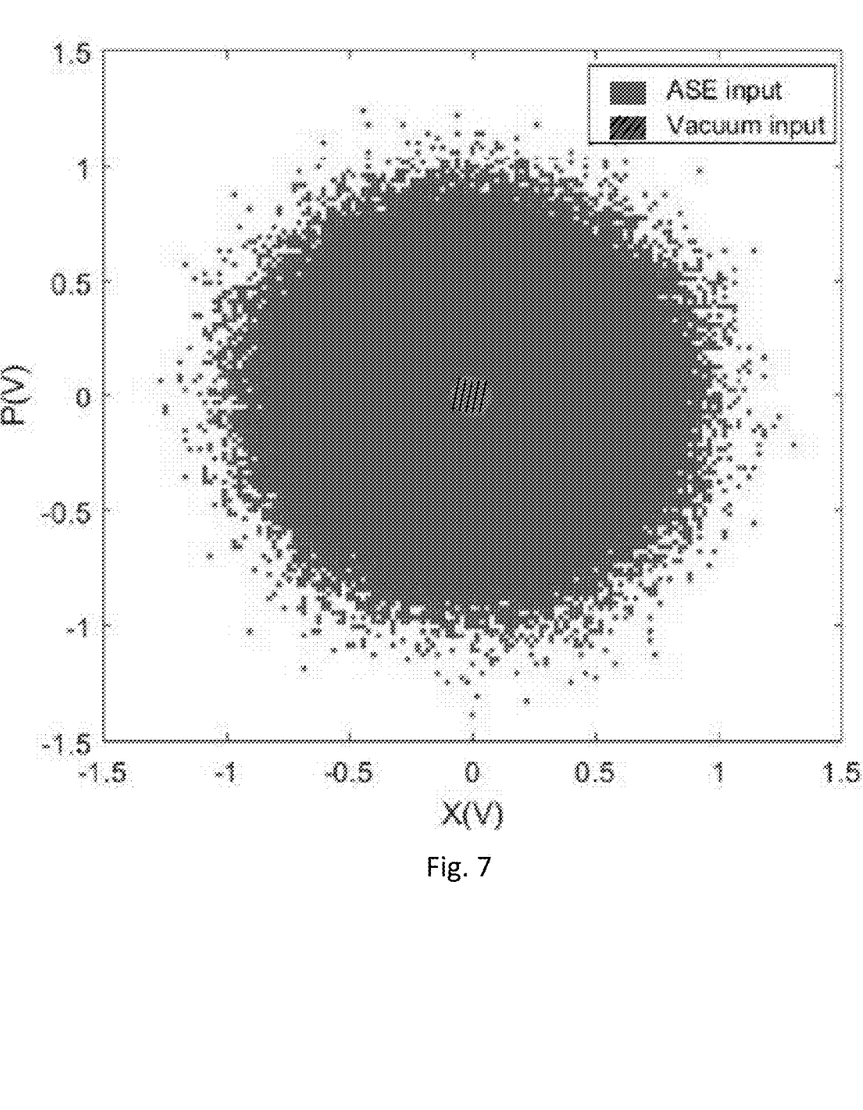
FIG. 7 shows measurement results with a vacuum input and a thermal state input in phase space.
Figure 8:
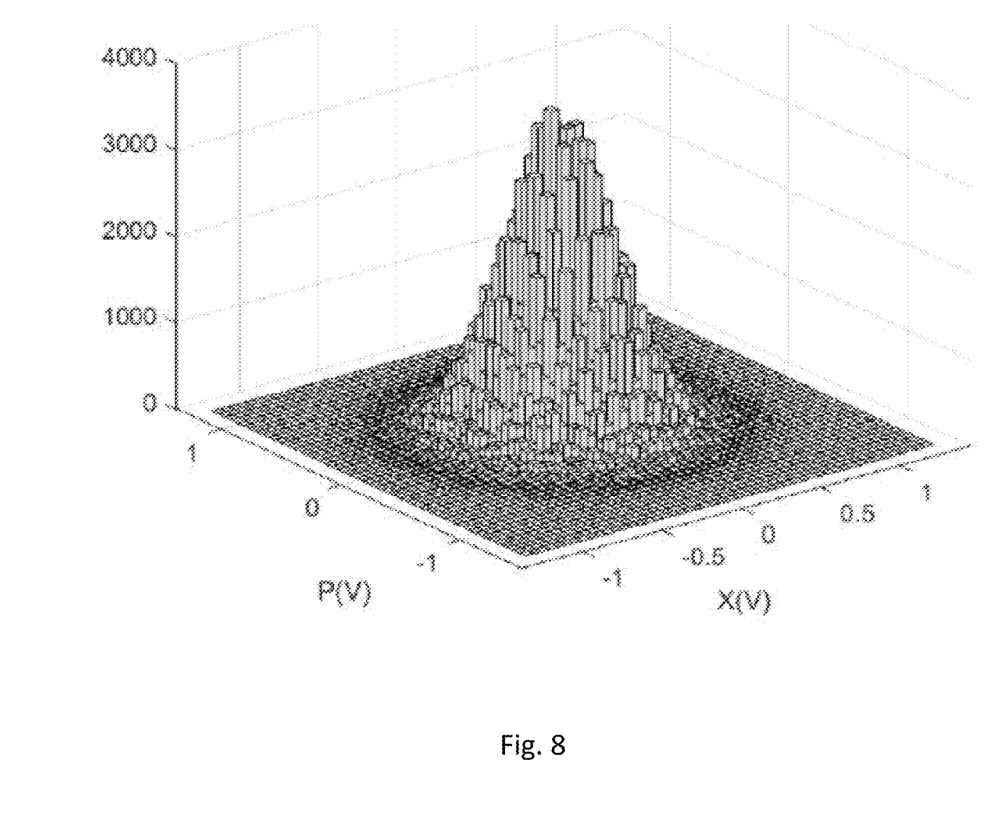
FIG. 8 shows a histogram of sample results with a thermal state input.

The noise of the two balanced detectors 516 of the depicted embodiment are 0.37 and 0.35 in the shot-noise unit. The overall detection efficiency (taking into account the loss of the 90 optical hybrid 614 and the quantum efficiency of the photodiodes 516) is about 0.5. FIG. 7 shows the distributions of the measurement results with either a vacuum input or a thermal input. By normalizing the quadrature variances of the thermal state to the vacuum noise, the average photon number (per mode) of the thermal state can be determined to be about 800. Such a thermal source is bright enough to implement the passive CV-QKD scheme, discussed above. FIG. 8 shows a two-dimensional histogram of the measured data when the input is a thermal state. The small deviation from a perfect two-dimensional Gaussian distribution can be due to the non-uniform bin size of the 8-bit analog-to-digital converter of the oscilloscope.

The single-time second-order correlation function $g^{(2)}(0)$ is a parameter to characterize a photon source. $g^{(2)}(0)$ can be conveniently calculated from the statistics of the conjugate homodyne measurement using $$g^{(2)}(0) = \frac{\langle Z^2 \rangle - 4\langle Z \rangle + 2}{(\langle Z \rangle - 1)^2}, \quad (22)$$

where $Z = X^2 + P^2$.

The $g^{(2)}(0)$ of one embodiment of an ASE source is 2.012, which is reasonably close to the theoretical value of 2 for a perfect thermal source.

In the GMCS QKD system, the quantum state preparation step is implemented using a random number generator, a weak coherent source, and high performance optical modulators. Quantum random number generation schemes are discussed in U.S. patent application Ser. No. 16/057,345 to Qi, entitled Quantum Random Number Generator, filed Aug. 7, 2018; and QI, B., "True randomness from an incoherent source", Review of Scientific Instruments 88, 113101, published Nov. 1, 2017, both of which are incorporated by reference in their entirety. In the present invention, a passive state preparation scheme is described where Alice and Bob generate shared randomness by measuring correlated thermal states split from a common thermal source. This scheme significantly simplifies the implementation of CV-QKD and makes it more practical.

There are two potential types of imperfections on the transmitter side. One is associated with the thermal source itself, and the other is associated with transmitter side detector.

To deal with the imperfection of the thermal source itself, precise quantum state tomography can be performed to quantify the deviation of the output of the source from a perfect thermal state. There should be a lack of correlation between quadrature values of different modes. Otherwise, Eve may gain information without introducing noise by measuring modes not detected by Alice and Bob. Once the imperfection of the source has been quantified, it should be taken into account in the secure proof and key rate calculation. The output of a practical light source may drift with time, and the state tomography process may be repeated. In the conventional active state preparation scheme, both the laser source and the modulators need to be calibrated over time for similar reasons. A thermal source operated in continuous wave mode may show better stability than optical modulators operated at high speed.

Alice's detector noise can be untrusted and thus the corresponding excess noise can be attributed to Eve's attack. In practice it is unlikely that Eve can access Alice's system, so Alice's detector noise could be trusted, just like the noise from Bob's detector. Under reverse reconciliation, the trusted noise from Alice's detector will reduce the mutual information $I_{AB}$ but will not change Eve's information $\chi_{BE}$. This trusted noise model can tolerate higher detector noise and work with a lower photon number of the source. To justify the trusted noise model in practice, a specially designed monitoring system may be utilized to prevent Eve from manipulating the detector performance.

The randomness is generated from a thermal source. While quantum randomness is ultimately connected to quantum superposition states, in the trusted device scenario, the state received by the detector does not need to be a pure state. For example, trusted randomness can be generated by measuring only one photon from an entangled photon pair, given Eve cannot access the other photon. In the current embodiments, photons from the thermal source are generated through spontaneous emission processes and are entangled with the atoms inside the source. Given the source itself is protected from Eve, true randomness can be generated.

In practice, embodiments can be implemented using a broadband source operated in continuous wave or pulsed mode (a multimode source), thanks to the mode-selective feature of coherent detection. Since the randomness carried by different modes of the source are independent of each other, to generate shared randomness Alice's and Bob's detectors can measure the same mode of the source. Furthermore, Alice and Bob have a scheme to establish a phase reference between their homodyne detection. Two schemes have been developed in CV QKD based on active state preparation, and either of them can be adopted in the passive state preparation protocol. In the first scheme, Alice generates two strong LOs from the same laser, uses one of them in her local measurement, and sends the second one to Bob to be used as a LO in his measurement. As discussed in U.S. Pat. No. 9,768,885, which was previously incorporated by reference, in a second scheme, both Alice and Bob generate LO signals from their own local lasers. The phase relation between their measurement bases can be determined by sending a relatively weak phase reference pulse between Alice and Bob.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation (s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A passive continuous variable quantum key distribution method comprising:
    splitting an output of a thermal source into a first beam of the output of the thermal source and a second beam of the output of the thermal source;
    attenuating the first beam;
    communicating the attenuated first beam across a quantum communication channel from a transmitter to a receiver;
    measuring a quantum state of the attenuated first beam, wherein measuring the quantum state of the attenuated first beam includes performing conjugate homodyne detection on the attenuated first beam to measure multiple quantum states of the attenuated first beam;
    measuring a quantum state of the second beam, wherein measuring the quantum state of the second beam includes performing conjugate homodyne detection on the second beam to measure multiple quantum states of the second spatial mode; and
    establishing a shared key based on the quantum state of the first beam and the quantum state of the second beam.

2. The passive continuous variable quantum key distribution method of claim 1, wherein said splitting and said attenuating are accomplished by at least one of a) an asymmetric beam splitter, and b) a combination of a beam splitter and an attenuator.

3. The passive continuous variable quantum key distribution method of claim 1, wherein said communicating the attenuated first beam across the quantum communication channel from the transmitter to the receiver includes communicating the attenuated first beam across the quantum communication channel from the transmitter to the receiver without a random number generator and without an optical modulator actively modulating generated random numbers on to the first beam.

4. A passive continuous variable quantum key distribution method comprising:
    splitting an output of a thermal source into a first beam of the output of the thermal source and a second beam of the output of the thermal source, wherein the thermal source is configured to emit light having a multiwavelength spectrum;
    attenuating the first beam;
    communicating the attenuated first beam across a quantum communication channel from a transmitter to a receiver;
    measuring a quantum state of the attenuated first beam, wherein measuring the quantum state of the attenuated first beam includes performing homodyne detection on the attenuated first beam, wherein performing homodyne detection on the attenuated first beam includes aligning a central wavelength of a first local oscillator within the multiwavelength spectrum;
    measuring a quantum state of the second beam, wherein measuring the quantum state of the second beam includes performing homodyne detection on the second beam, and wherein performing homodyne detection on the second beam includes aligning a central wavelength of a second local oscillator within the multiwavelength spectrum; and
    establishing a shared key based on the quantum state of the first beam and the quantum state of the second beam.

5. The passive continuous variable quantum key distribution method of claim 4, wherein said splitting and said attenuating are accomplished by at least one of a) an asymmetric beam splitter, and b) a combination of a beam splitter and an attenuator.

6. The passive continuous variable quantum key distribution method of claim 4, wherein said communicating the attenuated first beam across the quantum communication channel from the transmitter to the receiver includes communicating the attenuated first beam across the quantum communication channel from the transmitter to the receiver without a random number generator and without an optical modulator actively modulating generated random numbers on to the first beam.

7. A passive continuous variable quantum key distribution system comprising:
    a thermal source configured to generate an output having quantum noise;
    a beam splitter that splits the output of the thermal source into a first beam and a second beam;
    an attenuator for attenuating the first beam;
    a transmission system configured to transmit the attenuated first beam over a quantum communication channel;
    a receiver system configured to receive over the quantum communication channel the attenuated first beam and determine information about the quantum state of the attenuated first beam;
    a detector system configured to detect a quantum state of the second beam, wherein the detector system configured to detect a quantum state of the second beam is a conjugate homodyne detection system configured to detect a first quantum state of the second beam and a second quantum state of the second beam; and
    a control unit operably coupled to said detector system and the receiver system, said control unit configured to establish a shared private key based on the quantum state of the second beam and the information about the quantum state of the attenuated first beam, wherein the information about the quantum state of the attenuated first beam includes information about a first quantum state of the attenuated first beam and information about a second quantum state of the attenuated first beam.

8. The passive continuous variable quantum key distribution system of claim 7, wherein an asymmetric beam splitter unit is configured as said beam splitter and said attenuator.

9. The passive continuous variable quantum key distribution system of claim 7, wherein said transmission system is configured to transmit said attenuated first beam over the quantum communication channel to the receiver system without a random number generator and without an optical modulator actively modulating generated random numbers on to the first spatial mode.

10. A passive continuous variable quantum key distribution system comprising:
   a thermal source configured to generate an output having quantum noise, wherein the thermal source is configured to emit light having a multiwavelength spectrum;
   a beam splitter that splits the output of the thermal source into a first beam and a second beam;
   an attenuator for attenuating the first beam;
   a transmission system configured to transmit the attenuated first beam over a quantum communication channel;
   a receiver system configured to receive over the quantum communication channel the attenuated first beam and determine information about the quantum state of the attenuated first beam;
   a detector system configured to detect a quantum state of the second beam, wherein said detector system is configured to align a central wavelength of a local oscillator within the multiwavelength spectrum; and
   a control unit operably coupled to said detector system and the receiver system, said control unit configured to establish a shared private key based on the quantum state of the second beam and the information about the quantum state of the attenuated first beam.

11. The passive continuous variable quantum key distribution system of claim 10, wherein the thermal source comprises an amplified spontaneous emission source.

12. The passive continuous variable quantum key distribution system of claim 11, wherein the amplified spontaneous emission source comprises a superluminescent light emitting diode.

13. A method of generating shared random information in a transmitter and a receiver using a thermal source, the method comprising:
   splitting the output of the thermal source into a first beam and a second beam;
   attenuating the first beam by an attenuation amount;
   communicating the attenuated first beam across a quantum communication channel from the transmitter to the receiver;
   measuring a quantum state of the attenuated first beam, wherein measuring the quantum state of the attenuated first beam includes performing conjugate homodyne detection on the attenuated first beam to measure multiple quantum states of the attenuated first beam;
   generating random information based on the quantum state of the attenuated first beam;
   measuring a quantum state of the second beam, wherein measuring the quantum state of the second beam includes performing conjugate homodyne detection on the second beam to measure multiple quantum states of the second beam; and
   generating random information based on the quantum state of the second beam; and
   wherein at least a portion of the random information based on the quantum state of the attenuated first beam is identical to at least a portion of the random information based on the measured quantum state of the second beam.

14. The method of generating shared random information of claim 13 including at least one of attenuating the second beam based on the attenuation amount of the first beam.

15. The method of generating shared random information of claim 13, wherein said splitting and attenuating are accomplished by at least one of a) an asymmetric beam splitter, and b) a combination of a beam splitter and an attenuator.

16. The method of generating shared random information of claim 13, including authenticating the generated random information, based on the quantum state of the attenuated first beam and the quantum state of the second beam, by communicating information between the transmitter and receiver.

17. The method of generating shared random information of claim 13, wherein said communicating the attenuated first beam across the quantum communication channel from the transmitter to the receiver includes communicating the attenuated first beam across the quantum communication channel from the transmitter to the receiver without a random number generator and without an optical modulator actively modulating generated random numbers on to the first beam.

18. A method of generating shared random information in a transmitter and a receiver using a thermal source, wherein the thermal source is configured to emit light having a multiwavelength spectrum, the method comprising:
   splitting the output of the thermal source into a first beam and a second beam;
   attenuating the first beam by an attenuation amount;
   communicating the attenuated first beam across a quantum communication channel from the transmitter to the receiver;
   measuring a quantum state of the attenuated first beam, wherein measuring the quantum state of the attenuated first beam includes performing homodyne detection on the attenuated first beam, wherein performing homodyne detection on the attenuated first beam includes aligning a central wavelength of a first local oscillator within the multiwavelength spectrum;
   generating random information based on the quantum state of the attenuated first beam;
   measuring a quantum state of the second beam, wherein measuring the quantum state of the second beam includes performing homodyne detection on the second beam, and wherein performing homodyne detection on the second beam includes aligning a central wavelength of a second local oscillator within the multiwavelength spectrum; and
   generating random information based on the quantum state of the second beam; and
   wherein at least a portion of the random information based on the quantum state of the attenuated first beam is identical to at least a portion of the random information based on the measured quantum state of the second beam.

19. The method of generating shared random information of claim 18 comprising attenuating the second beam based on the attenuation amount of the first beam.

20. The method of generating shared random information of claim 18, wherein said splitting and attenuating are accomplished by at least one of a) an asymmetric beam splitter, and b) a combination of a beam splitter and an attenuator.

21. The method of generating shared random information of claim 18, comprising authenticating the generated random information, based on the quantum state of the attenuated first beam and the quantum state of the second beam, by communicating information between the transmitter and receiver.

22. The method of generating shared random information of claim 18, wherein said communicating the attenuated first beam across the quantum communication channel from the transmitter to the receiver includes communicating the attenuated first beam across the quantum communication channel from the transmitter to the receiver without a random number generator and without an optical modulator actively modulating generated random numbers on to the first beam.

* * * * *